United States Patent [19]
Thomas et al.

[11] Patent Number: 5,920,801
[45] Date of Patent: Jul. 6, 1999

[54] COMMUNICATIONS SYSTEM AND CORRESPONDING EQUIPMENT FOR A SUBSCRIBER INSTALLATION

[75] Inventors: Gérard Thomas, Eragny Sur Oise; Daniel Lecomte, Paris; Luc Brignol, Paris; Florence Christien, Paris, all of France

[73] Assignee: Alcatel Business Machines, Paris, France

[21] Appl. No.: 08/729,393

[22] Filed: Oct. 11, 1996

[51] Int. Cl.[6] .................................................. H04N 7/173
[52] U.S. Cl. ................................ 455/3.1; 348/8; 348/10; 348/6; 455/6.3
[58] Field of Search .................................. 348/8, 12, 13, 348/7, 10, 6; 455/4.2, 3.1, 5.1, 6.2, 6.3; H04N 7/173

[56] References Cited

U.S. PATENT DOCUMENTS

| | | | |
|---|---|---|---|
| 4,912,553 | 3/1990 | Pal et al. | 348/8 |
| 5,321,846 | 6/1994 | Yokota et al. | 455/4.2 |
| 5,432,838 | 7/1995 | Purchase et al. | 348/13 |
| 5,708,961 | 1/1998 | Hylton et al. | 455/4.2 |
| 5,787,335 | 7/1998 | Novak | 455/6.2 |

FOREIGN PATENT DOCUMENTS

| | | |
|---|---|---|
| 0658024 A1 | 6/1995 | European Pat. Off. . |
| 6252815 | 9/1994 | Japan ........................................ 348/8 |

*Primary Examiner*—John K. Peng
*Assistant Examiner*—Linus H. Lo
*Attorney, Agent, or Firm*—Sughrue, Mion, Zinn, Macpeak & Seas, PLLC

[57] ABSTRACT

The system includes centralizing communications equipment (4) provided with first transmitter-receiver means (5, 6) connected to at least one transmit and receive cable (3) for transmitting and receiving radio signals, which cable extends throughout the served installation. The system also includes subscriber terminal appliances (2A to 2E) located in the installation and provided with second transmitter and/or receiver means (8 to 12) for transmitting and/or receiving radio signals, which means enable the terminal appliances to communicate via the communications equipment. The communications equipment re-transmits the signals that it receives to each destination terminal appliance in the installation and, with the assistance of additional means (27 to 31), outside said installation. The subscriber terminal appliances and the centralizing communications equipment respectively include means enabling them to transmit and/or receive digitized information signals in the form of packets and via radio links.

5 Claims, 3 Drawing Sheets

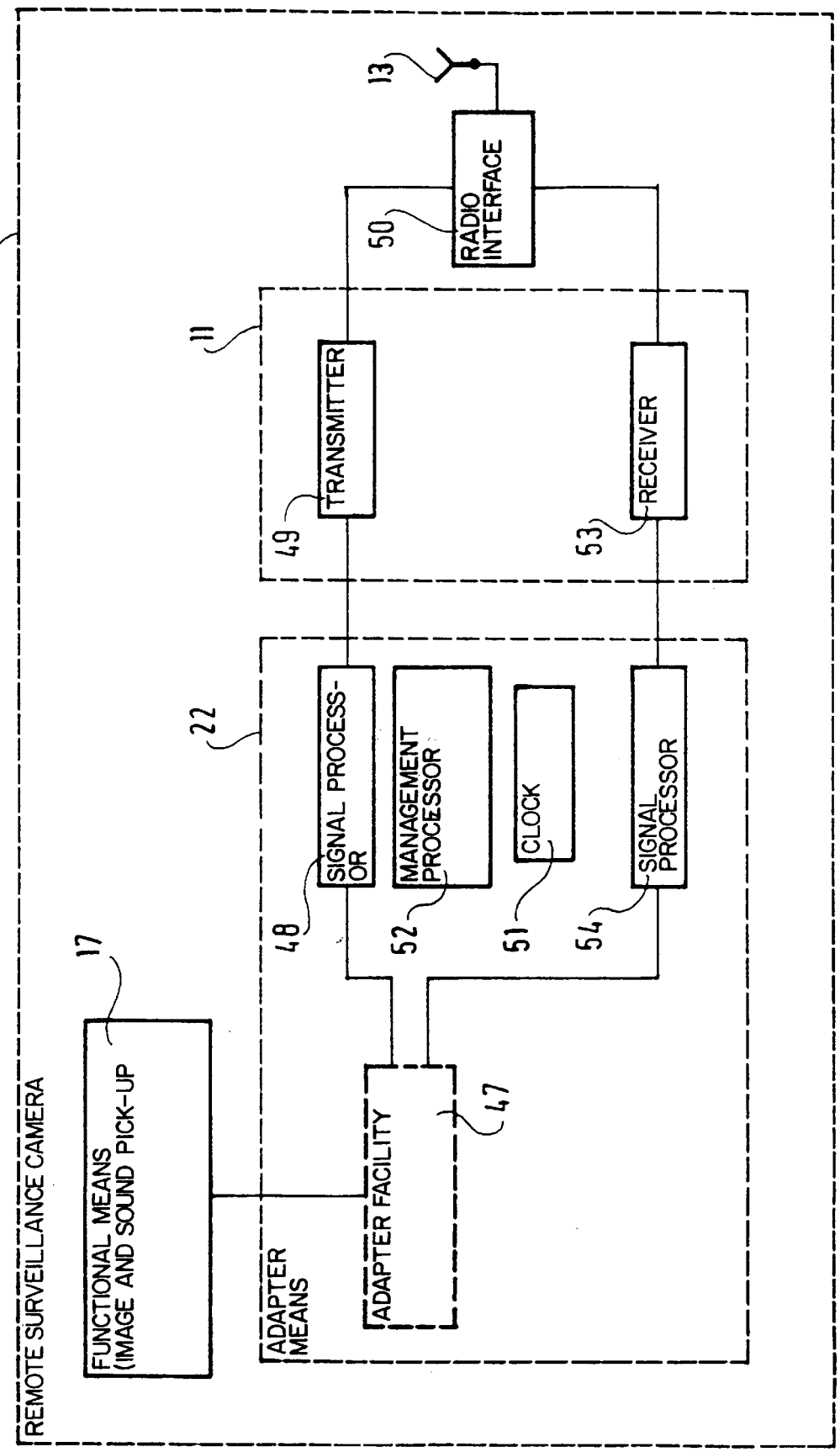

COMMUNICATIONS SYSTEM AND CORRESPONDING EQUIPMENT FOR A SUBSCRIBER INSTALLATION

The invention relates to a communications system for a subscriber installation, and to equipment relating to the system.

Numerous communications systems exist that are designed to enable information in various forms to be received and transmitted in a "subscriber" installation.

"Private" telephone communications systems that equip subscriber installations thus make it possible to interchange information between terminal appliances made available to users in the installation. Generally, the terminal appliances in an installation can also communicate with terminal appliances situated outside the installation that includes them via at least one common telephone communications network on which the installation in question is parented as are other installations. A subscriber installation organized around such a telephone-type system commonly includes an internal network of links (generally wired links) connecting the various communications terminal appliances made available to the users to a main communications unit. This unit is, for example, constituted by an exchange which serves to set up calls between the terminal appliances and which is therefore connected to the various links of the internal network and to those of the common telephone communications network on which the installation in question is parented.

It is known that communications systems based on wired links usually include wiring and points of access to the wiring for the terminal appliances which are fixed in the installations that include them. This constitutes a major problem when the positioning of the terminal appliances in an installation changes over time as a function of user needs, or when the number of terminal appliances increases beyond initial forecasts. This also constitutes a problem when it becomes necessary to adapt the wiring and the access points because of changes in communications techniques and in the technical requirements of users.

The same drawbacks are also to be found in other communications systems for subscriber installations, which systems also include fixed wired networks to which the terminal appliances are connected via access points that are generally fixed One such known system includes a common receiver unit which is used to receive and broadcast audio-visual information, in particular television programs, to users in a subscriber installation. Other systems of that type include wiring and access points that are generally fixed and that are used to interconnect, e.g. in a ring, a plurality of terminal appliances for presenting and/or processing information in an installation.

Conventionally, communications systems sometimes use wiring and therefore access points that are distinct and necessarily different, while coexisting on the same premises of an installation, so as to serve terminal appliances using different technologies, and this suffers from numerous drawbacks.

It is also known that information can be interchanged between terminal appliances via radio links, thereby limiting or removing needs as regards communications wiring between terminal appliances. The only wiring then remaining is constituted by individual links connecting each terminal appliance to its transmit and/or receive antenna, which links are often of negligible length. Unfortunately, information communications systems using radio links are not necessarily suitable for equipping subscriber installations implemented on determined local premises, as is usually the case for telephone-type systems.

In numerous cases, a plurality of subscriber installations can have to coexist on neighboring premises, e.g. in the same building. It can be difficult to control accurately the transmission ranges of the antennas of transmitter terminal appliances in such neighboring installations on their respective premises, which presents a drawback as is also known.

The invention therefore provides a communications system for a subscriber installation, the system including centralizing communications equipment provided with first transmitter-receiver means connected to at least one transmit and receive cable for transmitting and receiving radio signals, which cable extends throughout the installation and enables the centralizing equipment to have terminal appliances communicate via radio signals, each of which terminal appliances is provided with second transmitter and/or receiver means for this purpose. The centralizing equipment and the terminal appliances are respectively provided with first means and with second means enabling them to transmit and/or to receive digitized information put in the form of packets in "N" predetermined distinct channels of the frequency band usable with a cable.

According to a characteristic of the invention, the centralizing equipment also includes detection means for determining the frequencies of the transmissions received via the cable(s) in the installation, and optionally from transmitter means outside said installation, and selection means for determining, as a function of the indications supplied by the detection means, the transmit and receive channels allocated to the centralizing communications equipment and to the terminal appliances.

The invention also provides centralizing communications equipment. According to a characteristic of the invention, the centralizing communications equipment includes first means enabling it to transmit and/or to receive digitized information put in the form of packets in "N" predetermined distinct channels of the frequency band usable with a cable, detection means for determining the frequencies of all of the transmissions received via the cable(s) in the installation, and optionally from transmitter means outside said installation, and selection means for determining, as a function of the indications supplied by the detection means, the transmit and receive channels allocated both to the centralizing communications equipment and also to the terminal appliances in the installation.

The invention also provides equipment, of the subscriber terminal appliance type, provided with second transmitter and/or receiver means enabling it to transmit and/or receive digitized information put in the form of packets in at least one of the "N" predetermined distinct channels of the frequency band usable with a cable [this channel].

According to a characteristic of the invention, each terminal appliance includes second transmitter and/or receiver means enabling it to use at least one common service channel organized to convey frequency setting indications in the form of one or more packets.

The invention is explained in more detail in the following description given with reference to the figures in the following list.

FIG. 3 is a block diagram of a terminal appliance equipped to communicate by using the system of the invention;

Figure 1:
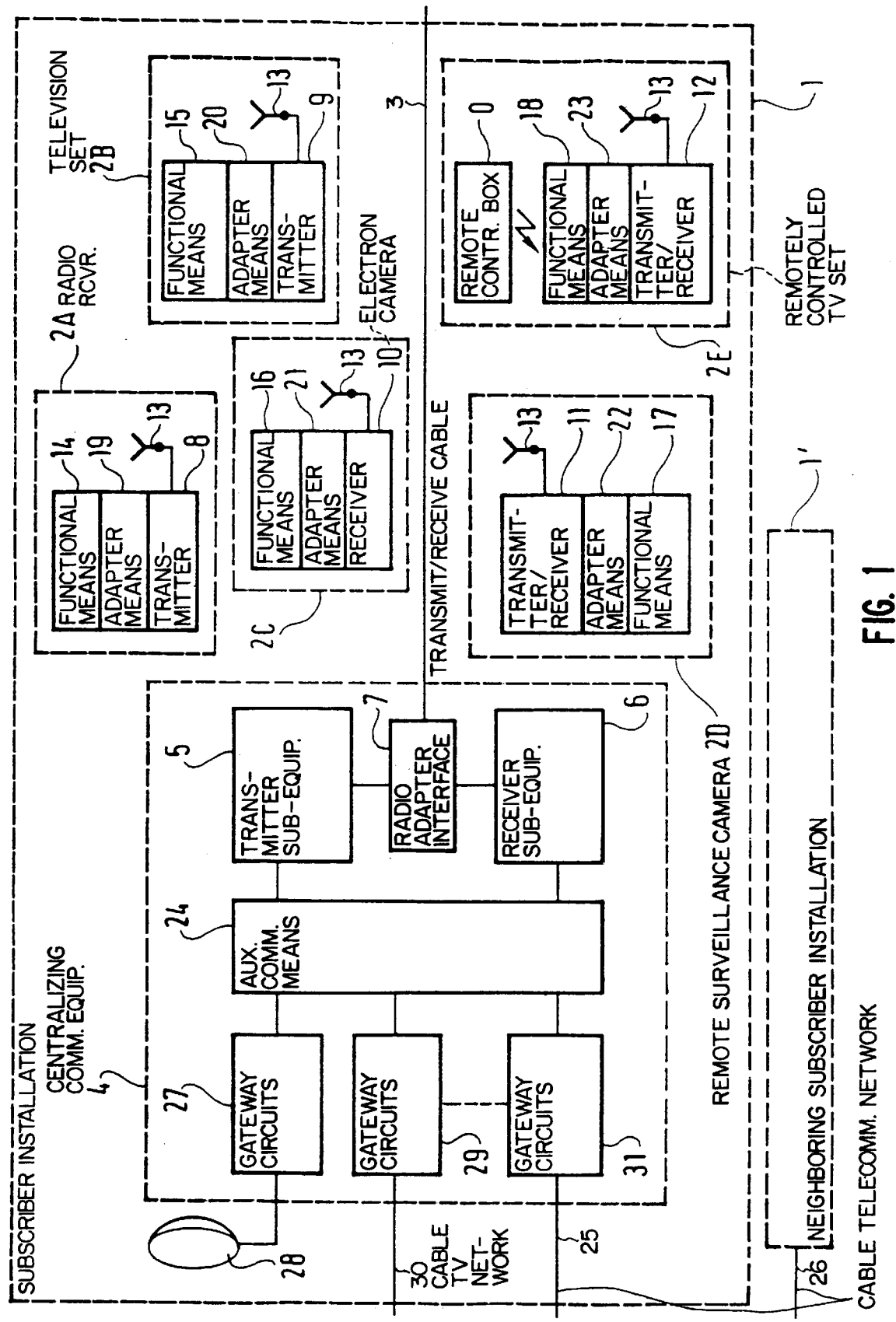
FIG. 1 is a block diagram of a communications system of the invention for a subscriber installation.

It is assumed that the communications system shown in FIG. 1 is to equip a subscriber installation 1 that can include various terminal appliances 2 such as 2A 2B, 2C, with communications possibilities being available to them directly or indirectly.

In the remainder of this description, the term "communications terminal appliances" covers both communications terminal appliances proper which are specifically designed so that they can operate using the system of the invention, and also terminal appliances that can have a wide variety of functions and that are provided with accessory means offering them communications possibilities using the communications system of the invention.

Some of the terminal appliances 2 can operate as information signal receivers only, so that the information conveyed by the signals is restored in a form accessible to a human user, or in a form usable by the terminal appliance that receives them or by apparatus or a system (not shown) for which the terminal appliance then serves as an intermediary.

Such receiver terminal appliances are referenced 2A and 2B in FIG. 1, terminal appliance 2A corresponding, for example, to a radio receiver, while terminal appliance 2B corresponds to a television set. Both of them can be terminal appliances specifically designed to operate using the communications system of the invention, or terminal appliances subsequently equipped with additional means enabling them to operate using the system of the invention. For example, the additional means may be received in a separate additional box that is associated with an existing terminal appliance, or they may be implemented in the form of an additional circuit designed to be incorporated in the container of an existing terminal appliances. By assumption, the same applies for all of the terminal appliances that are considered below.

Other terminal appliances 2 can operate essentially as generators of information signals, in particular sound, image, control, and alarm signals, etc. Such a terminal appliance is referenced 2C in FIG. 1.

Other terminal appliances 2 can operate both as information signal transmitters and as information signal receivers, e.g. telephone sets or videophone sets, facsimile machines, multimedia computers, apparatus or systems equipped with means enabling them to be radio-controlled, etc. Such terminal appliances are referenced 2D and 2E in FIG. 1. For example, terminal appliance 2D may be a system that can be remote controlled and that is therefore equipped with both-way communications means for that purpose, and terminal appliance 2E may be a television set assumed to be equipped with a cordless local remote control box 0, e.g. operating by infrared signals, enabling the television set to be used interactively.

The various terminal appliances 2 in an installation are placed in a known delimited environment which, in general, is relatively rarely modified for any given installation. However, at least some of the terminal appliances are likely to be displaced with various degrees of frequency within the delimited environment. A subscriber installation, such as 1, is often situated in the vicinity of another subscriber installation, such as 1', or optionally of a plurality of other subscriber installations, e.g. in the same building, or in neighboring buildings. It is therefore necessary to try and avoid uncontrolled cross-communications between communications systems in neighboring installations.

In accordance with the invention, provision is made for said communications system to enable the various terminal appliances in a subscriber installation to communicate via one or at least one link constituted by a transmit and receive cable 3 extending throughout the installation and leading to centralizing communications equipment 4.

For example, such a cable may have a structure analogous to that of a radiating cable as used for broadcasting information transmitted in the form of radio signals to mobile receiver terminal appliances moving substantially parallel to the cable. For reasons of simplicity, a single transmit and receive cable link 3 is considered in the remainder of the description, it being understood that equipping the same installation with more than one transmit and receive cable can be deduced from the indications given herein.

The transmit and receive cable 3 is placed in the installation in such manner that the transmit and receive range zones that correspond to it coincide with those zones of the installation in which the terminal appliances 2 of the installation are likely to be placed. The cable must be placed in compliance with the rules of the art and as a function of the configuration of the installation so that any terminal appliance 2 that can operate as a signal receiver in the installation can receive under satisfactory operating conditions the radio signals transmitted or re-transmitted via the transmit and receive cable by the centralizing communications equipment 4 of the installations regardless of the position of said terminal appliance in the installation.

The cable must also be placed in such manner that the radio signals transmitted by a terminal appliance 2 inside the installation can be received by the centralizing communications equipment 4 under satisfactory operating conditions, via the cable acting as a receive antenna for said equipment.

Naturally, to obtain these operating conditions, the various relevant elements of the communications system must be mutually suitable, these elements being constituted firstly by the transmit and receive cable 3, as positioned in an installation, and secondly by the transmitter and/or receiver means of the terminal appliances 2 and of the centralizing communications equipment 4.

In the embodiment shown in FIG. 1, the centralizing communications equipment includes "first" transmitter-receiver means split up into transmitter sub-equipment 5 and receiver sub-equipment 6, both items of equipment being optionally modular and being connected to the transmit and receive cable 3 via a radio adapter interface 7 so that they can respectively transmit to and receive from the terminal appliances 2 in the installation via the cable 3. The items of sub-equipment 5 & 6 and the interface 7 are not described in any more detail herein insofar as they can be implemented using techniques that are well known to a person skilled in the art. They make it possible conventionally to transmit or to receive signals that are respectively to be transmitted or already transmitted in various frequency sub-bands which are selected in the frequency passband conveyed by the chosen transmit and receive cable 3 and which are allocated, under conditions that are described below, to the centralizing communications equipment 4 and to the terminal appliances 2 that can transmit in the installation in question.

The terminal appliances 2 include "second" transmitter and/or receiver means which are shown in FIG. 1 in the form of two items of transmitter sub-equipment 8 & 9 respectively assigned to the receiver terminal appliances 2A & 2B, one item of receiver sub-equipment 10 assigned to the essentially transmitting terminal appliance 2C, and two items of transmitter-receiver sub-equipment 11 & 12 respectively assigned to the transmitter-receiver terminal appliances 2D & 2E.

The various items of sub-equipment are conventionally provided with antennas given the general reference 13 although they are not necessarily identical, and implemented using known techniques so as to be capable of transmitting and/or receiving in at least a portion of the frequency passband conveyable by the transmit and receive cable 3, which passband is specified below The various items of sub-equipment can also either be incorporated into the terminal appliances 2 that they equip, or else be added externally, e.g. fitted onto the terminal appliances 2 to which they are then connected by means described below.

Each of the terminal appliances 2 also has one or more specific functions for which it includes a set of suitable means, referred to as "functional means" herein, which are not described in any more detail herein, and it is assumed to be suitable for supplying and/or receiving information in determined forms. Thus, the terminal appliance 2A, which is of the radio receiver type, is assumed to include a set of functional means 14 enabling public radio broadcasts to be picked up and restored in the form of sound, the terminal appliance 2B, which is of the television set type, is assumed to include a set of functional means 15 enabling television broadcasts to be picked up and restored in the form of sound and image. Similarly, the terminal appliance 2C, e.g. of the electron camera type, is assumed to include a set of functional means 16 for producing electrical image signals on the basis of what is in the field of a lens that it includes, the signals being processed so that they can be used subsequently for displaying the filmed images on a screen of a suitable reproduction terminal appliance. In this example, it includes means (not shown) enabling it to receive and to transmit auxiliary signalling information.

The terminal appliances referenced 2D and 2E are likewise assumed to include respective sets of functional means 17 and 18 which are constituted depending on their respective functions, and which are not described in any more detail herein insofar as they are only indirectly related to the invention.

The functional means of any one of the terminal appliances 2A, 2B, 2C, 2D, 2E are connected to the second transmitter and/or receiver means of the same terminal appliance via adapter means, such as 19, 20, 21, 22, and 23, which, depending on needs, adapt the signals produced by certain types of equipment so that they can be taken into account by other types of equipment. Information is conveyed via the transmit and receive cable 3 in a standardized radio form regardless of the terminal appliances 2 in question, with variations being possible while remaining within the standardized form as a function of the needs of the various terminal appliances as regards conveying information.

In a preferred embodiment, the information to be conveyed via the transmit and receive cable 3 is digitized and conveyed in standardized packets.

Optionally, the digitization is performed in the above-mentioned adapter means, if the information to be conveyed via the transmit and receive cable 3 is not supplied already in digital form An inverse operation is also performed on the received digitized information in the adapter means of the receiving terminal appliance, if need be.

Similarly, putting the digitized information in packets for conveying it via the transmit and receive cable 3, and the inverse operation on reception may also be performed in the adapter means of the receiver terminal appliance, also if need be.

Depending on the design of the terminal appliances 2, the adapter means may be integrated into the sets of functional means of certain terminal appliances, incorporated in the containers of other terminal appliances, incorporated in the containers of the transmitter and/or receiver sub-equipment individually associated with certain terminal appliances when the sub-equipment is separate from the terminal appliance onto which it is fitted, for example, or else housed in a separate container designed to be placed in an intermediate position between a terminal appliance and an item of sub-equipment.

Similarly, the centralizing communications equipment 4 which includes first transmitter-receiver means split up into an item of transmitter sub-equipment 5 and an item of receiver sub-equipment 6 in FIG. 1, also has a set of auxiliary communications means 24, in particular serving to enable information coming from one of the terminal appliances 2 in the installation via the transmit and receive cable 3 to be conveyed to one or optionally more other terminal appliances 2 in said installation via the same cable, as a function of the needs of the users in the installation.

In a preferred embodiment, the set of auxiliary communications means 24 are also organized to enable information to be conveyed between at least some of the terminal appliances situated in the installation and compatible terminal appliances independent therefrom, the independent terminal appliances being, for example, in another installation given the reference 1' in this example, the two installations being assumed in this example to be interconnected via links 25, 26 of a conventional communications network (not shown).

In this example, the set of auxiliary communications means 24 are assumed to have a switching function and a processing function for the information signals conveyed between terminal appliances in the installation via the transmit and receive cable 3, and via the transmitter sub-equipment transmit and the receiver sub-equipment 6. It has identical or similar functions for the information signals conveyed between at least one communications terminal appliance 2 of the installation 1 and at least one compatible terminal appliance (not shown) independent from the installation 1. Modular sets of gateway-forming dedicated circuits, such as 27, 28, and 29 are then provided in the installation for the information signals coming into the installation from terminal appliances independent therefrom, or going out from the installation to such independent terminal appliances. A set of gateway circuits 27 is thus assumed to serve to make it possible to interchange digitized information conveyed between the installation and at least one terminal appliance, e.g. of the server type, via an antenna 28 pointing towards a satellite of the Earth (not shown), using determined transmission procedures. Another set of gateway circuits 29 is, for example, more particularly organized to receive audiovisual information conveyed via a link 30 of a cable network for broadcasting television programs by implementing transmission procedures at least partially different from those mentioned above. Another set of gateway circuits 31 is, for example, used for interchanging information from the installation with identical or similar installations, such as 1' interconnected via at least one cable telecommunications network.

Figure 2:
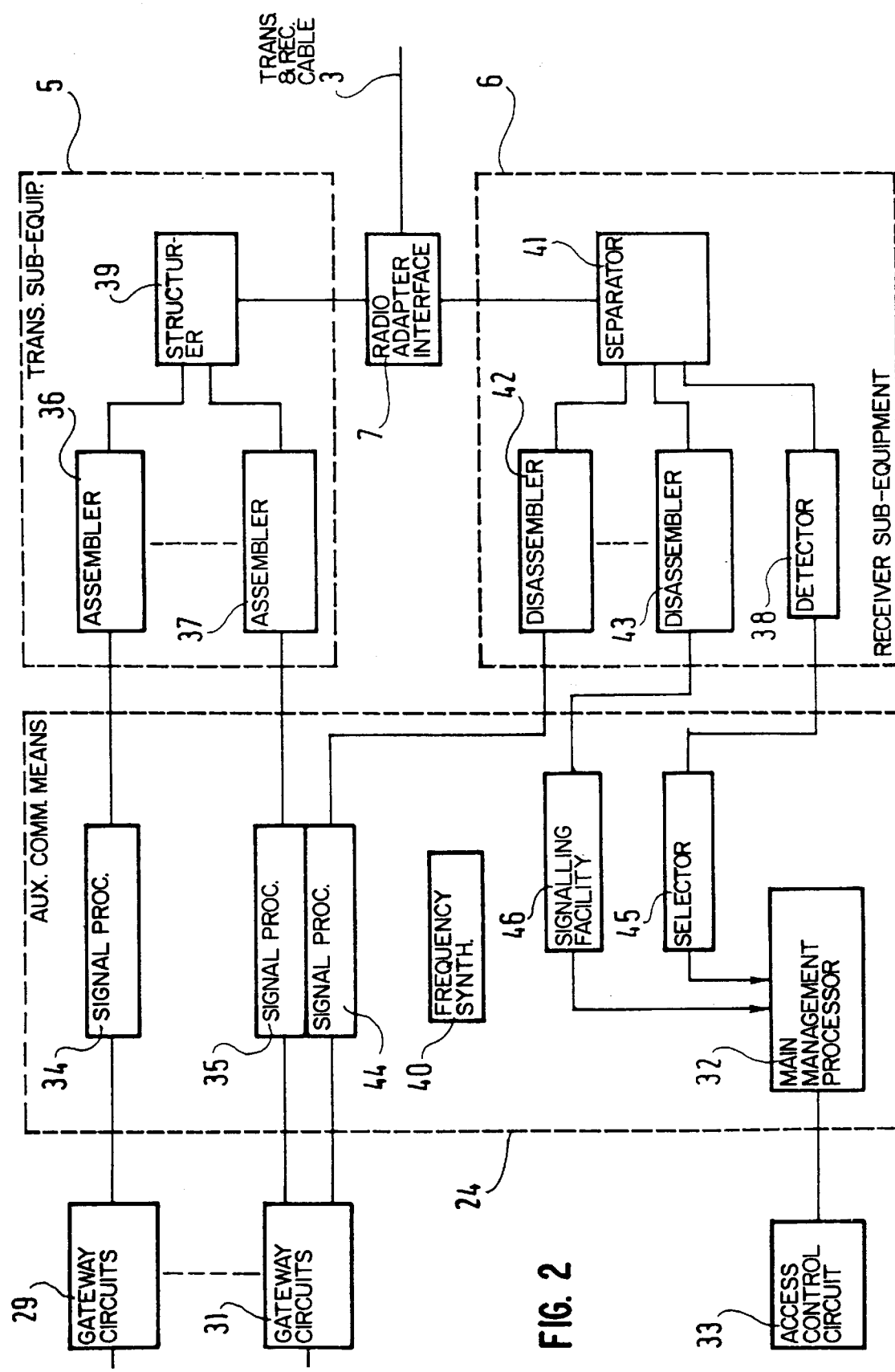
FIG. 2 is a block diagram of centralizing equipment for a system of the invention.

The block diagram of the centralizing communications equipment 4 shown in FIG. 2 makes it possible to go into more detail in describing the auxiliary communications means 24, and the transmitter sub-equipment 5 and the receiver sub-equipment 6 associated with said auxiliary communications means.

As already indicated, the set of "Q" gateway circuits 29 is assumed to enable at least one of the terminal appliances 2 of the installation to receive audiovisual programs coming from outside the installation, e.g. via a cable 30, it then being possible for "Q" programs to be received simultaneously by the set and broadcast in the installation via the transmit and receive cable 3. As already suggested, each gateway circuit of the set 29 is organized to be tunable so as to collect information coming from a source having determined selection characteristics. In the embodiment, tuning is supervised by a main management processor 32 for managing the installation, which processor is assumed in this example to be included in the set of auxiliary communications means 24, the links between the processor and the gateway circuits not being shown in this figure in order to simplify the diagram The various possible tuning operations that can be implemented by the main management processor 32 on request from the terminal appliances 2 that communicate with it for this purpose via a signalling facility 46 are explained below.

As already indicated, the set of gateway circuits 29 is assumed to be one-way and organized to receive information coming from outside the installation, while the set of gateway circuits 31 is assumed to be both-way.

An access control circuit 33 may be associated with the set of auxiliary communications means 24 of an installation of the invention, and more particularly with the main management processor 32 of the set, so as, in particular, to solve problems of authorization and/or restriction of access to information, in particular originating from outside the installation, from the terminal appliances in said installation.

The access control circuit 33, which is not described in any more detail herein, is, for example, a circuit making it possible to take into account access authorization information, e.g. entered via a keypad of a reader designed to receive a private access card, or of any other equivalent means. The main management processor 32 generally supervises use of the gateway circuits and of the terminal appliances in the installation as a function of user requests and of operating criteria predetermined for the installation in question.

The information received by a circuit in a set of gateway circuits, such as for example 29, for the installation that includes it, is conveyed by the circuit to a signal processing facility 34 serving to convert it to a digital form enabling it to be put into packets, and to form packets coming from the circuit in question, which packets are to be transmitted via the transmit and receive cable 3 in the installation.

The same applies for information of external origin received by a circuit in a set of gateway circuits, such as for example 31 for the installation that includes it, the information being conveyed to a signal processing facility 35. For the information of external origin received by the circuit in question of the set 31, this facility plays a role corresponding to the role played by the signal processing facility 34 for the above-considered circuit of the set 29.

The packets respectively produced by the signal processing facility 34 serving the active circuits of the set of gateway circuits 29 are respectively conveyed to an assembling facility 36 so as to be distributed as a function of their respective origins in distinct zones of the overall frequency band used by the communications system of the invention of the installation in question.

The same applies for the packets produced by the signal processing facility 35 on the basis of the information received by the active circuits of the set 31, these packets being conveyed to an assembling facility 37 so as to be distributed as a function of their respective origins in zones distinct from those mentioned above of the overall frequency band used by the communications system.

For performing these distributions, each subscriber installation has detection means 38 (described below) which are, for example, situated in the receiver sub-equipment 6. The detection means are associated with selection means 45 assumed in this example to be included in the set of auxiliary communications means 24. The detection means are designed to be capable of scanning the frequency band that can be received via the transmit and receive cable 3 so as to determine the levels of the signals that can be conveyed by the cable to the centralizing communications equipment 4. The selection means 45 enable the installation that includes them to select for its needs at least one portion of the frequency band conveyable by the type of transmit and receive cable that is available to it, while taking account of the portions of this band that are already used for transmissions in the environment of the installation, when such transmissions due to external transmitter means can be received with a non-negligible level in the installation, it being possible for this to be determined by the detection means 38 as indicated above.

The detection means 38 also perform sharing between "N" different sub-bands distinct from the band portion(s) selected for the installation, so as to enable information from various origins to be conveyed simultaneously via the transmit and receive cable 3. Each of the zones of the overall frequency band used by the communications system, in which zones the packets are respectively distributed that are produced on the basis of information supplied by the active gateway circuits of an installation, corresponds in particular to one of the above-mentioned sub-bands. In this example, assigning sub-bands for a given installation is assumed to be supervised by the main management processor 32 of the installation, which processor is connected both to the assembling facilities, such as 36 and 37, and also to the relevant signal processing facilities, such as 34 and 35.

In the transmitter sub-equipment 5, the assembling facilities, such as 36 and 37 convey the packets for which they have organized the frequency distribution to a structuring facility 39 which combines the signals it receives into a composite signal to be transmitted over the transmit and receive cable 3 via the radio adapter interface 7, in sub-bands reserved for transmissions from the centralizing communications equipment 4 in the frequency band portions that are used locally by the installation. The structuring facility 39 is driven via a frequency synthesizer facility 40 controlled like it by the main management processor 32 of the installation. The radio adapter interface 7 also receives the radio signals that come from the terminal appliances 2 and that are conveyed by the transmit and receive cable 3. These signals also correspond to digital or digitized information which is transmitted in the form of packets by the terminal appliances, they are located in sub-bands reserved for transmission from the terminal appliances in the frequency band portions used locally by the installation, and they are taken into account by the receiver sub-equipment 6.

The receiver sub-equipment includes a separator facility 41 driven by the frequency synthesizer facility 40 and controlled by the main management processor 32 so as to demodulate the signals received in the sub-bands that can be used by the terminal appliances of the installation in question for their transmissions, and so as to enable these demodulated signals to be distributed to facilities serving to process the various signals obtained, the processing being dedicated depending on needs.

To this end, the receiver sub-equipment 6 includes disassembling facilities, such as 42 and 43, making it possible to separate the packets obtained from the demodulated signals as a function of their respective assignments. The disassembling facility 42 is in particular assumed to serve to take into account the packets relating to the information transmitted by a terminal appliance 2 of the installation so that it can be conveyed out of the installation via one of the gateway circuits of the set 31. This disassembling facility 42 is connected for this purpose to a signal processing facility 44 of the set of auxiliary communications means 24, which facility operates inversely to the above-mentioned signal processing facility 35, and restores the information supplied in the form of packets by the terminal appliance 2 considered above in a form compatible with the gateway circuit used for conveying it out of the installation. In this way, if a terminal appliance 2 transmits information to be conveyed to the outside of the subscriber installation that includes it via a gateway circuit of a set of gateway circuits 31 of the synchronous digital telephone type, the information received from the terminal appliance is suitably formatted in the signal processing facility 44 so as to enable the information to be sent in the form of eight-bit bytes via one or more time channels of a synchronous digital network link.

Similarly, the information transmitted by a terminal appliance of the installation in question to another terminal appliance 2 in the same installation via the transmit and receive cable 3 is taken into account by a disassembling facility (not shown) in the receiver sub-equipment 6, so as to be conveyed to a signal processing facility (not shown). This signal processing facility makes it possible to transfer the information received from the transmitting terminal appliance 2 in the form of packets conveyed in a first determined frequency sub-band by means of modified packets which are placed in a determined sub-band that is different from the first sub-band by an assembling facility (not shown) in the transmitter sub-equipment 5, so as to be transmitted to the destination terminal appliance 2 via the transmit and receive cable 3. By way of an example of an application, the transmitting terminal appliance 2 is, for example, a source of signals to be reproduced by sound, such as a recording reader type source for a high-fidelity sound reproduction system, while the terminal appliance 2 is, for example a sound play-back facility based on loudspeakers that is assumed to be connected via a radio link to the source, via the transmit and receive cable 3 and the centralizing communications equipment 4. Naturally, this makes it possible for both the source and the sound play-back facility to be positioned very freely and with considerable scope for change in the installation equipped in this way.

In a preferred embodiment, one of the disassembling facilities, referenced 43 in this example, is assumed to serve to take into account packets relating to signalling information that can be transmitted by terminal appliances 2 to the set of auxiliary communications means 24, to the gateway circuits, and/or to other terminal appliances during one-way or both-way calls. This disassembling facility 43 is assumed in this example to be connected to the main management processor 32, via the above-mentioned signalling facility 46 which receives the signalling information received from the terminal appliances 2 for use in the centralizing communications equipment 4.

In addition, the detection means 38 already mentioned above are also connected to the radio interface 7, in this example via the separator facility 41, so as to be capable of detecting those portions of the frequency band conveyable by the type of transmit and receive cable 3 of the installation which are already used elsewhere in the environment of the installation, and which should preferably not be used again in order to limit the risks of interference. This detection is preformed by scanning at least the frequency band portion(s) that can be used by the communications system in particular on starting up the system in the subscriber installation that it is to serve, and, for example, each time the system is started up again after being shut down. In this example, the scanning is assumed to be driven by an algorithm used by the main management processor 32.

It makes it possible to determine whether, in the absence of information being conveyed via the communications system of the invention, signals are received, via the transmit and receive cable 3 and via the radio adapter interface 7, with power levels that enable them to interfere with any calls set up in radio form via the system of the invention.

The system is thus capable of determining which usable frequency band portion(s) cannot be used because they are being used by others, and of choosing accordingly which sub-bands will be used by the centralizing communications equipment 4 and by the terminal appliances that it includes from among the available band portion(s).

This choice is made as a function of the specific needs of the installation to be served, and thus, in practice, as a function of the terminal appliances 2 that the installation is to include.

This choice of sub-bands is stored in a memory in the main management processor 32 conventionally provided with suitable memories, and in each terminal appliance 2 which receives and retains the indications enabling it to know the sub-band(s) concerning it.

In a preferred embodiment, these indications are conveyed via a common service channel situated in a determined frequency sub-band, this common channel being used by all of the installations equipped with a communications system of the invention, i.e. by all of the terminal appliances 2 and centralizing communications equipment of the installations. The transmissions via the service channel are intended to be made by means of packets, any centralizing communications equipment 4 identifying itself by an individual encoded address, and any terminal appliance 2 identifying itself by an individual encoded address incorporating the individual address of the centralizing communications equipment 4 of its parent installation.

In one embodiment, indications making it possible to set the frequencies of the transmitters and/or the receivers of the terminal appliances 2 of each communications system of the invention are conveyed to the terminal appliances via the common service channel after choosing the sub-bands for a given installation, each terminal appliance including known memory means (not shown) enabling it to retain the indications concerning it.

The frequency sub-band allocated to the common service channel can be very narrow insofar as use of this channel is likely to be at very low data-rates.

By way of example, any one installation can include sub-bands reserved for channels relating to different applications, in particular sub-bands for channels enabling information to be broadcast to the terminal appliances 2 from the centralizing communications equipment 4, sub-bands reserved for channels to be used by the terminal appliances 2 for their remote control operations, sub-bands for channels for enabling one-way or both-way calls to be set up between terminal appliances in addition to the sub-band reserved for the service channel. The information broadcast channels may be used for distributing audiovisual programs that may or may not be interactive, and in particular television programs, in the installation to the terminal appliances 2 technically capable of receiving them. Each broadcast channel whose data-rate possibilities are determined as a function of the service to be rendered is, in this example, preferably accompanied by a remote control channel which is specific to it and which is to be used by the terminal appliances 2 capable of using the information that it broadcasts. As already indicated, any information and commands are conveyed in the form of packets between the terminal appliances 2 and the centralizing communications equipment 4 regardless of their transmission direction, as specified below.

By way of additional example, inside calls between terminal appliances 2 in an installation may be set up by means of at least one or optionally two reserved "intercommunication" channels, e.g. each having a data rate of 2 Mbits per second. Naturally, a call can be set up between a terminal appliance 2 of the installation and an external terminal appliance in similar manner. In a manner known per se, the centralizing communications equipment 4 then conveys to a gateway circuit the information received from the terminal appliance 2 via an interconnection channel and addressed to the external terminal appliance, and it broadcasts via a second interconnection channel the information received from the external terminal appliance via the gateway circuit already considered.

The centralizing communications equipment 4 generally takes part in all of the transmissions made in the installation that includes it to or from a terminal appliance 2 in the installation.

It supplies information to be used while each of the packets that it transmits or that are transmitted to it is being formed. In a preferred embodiment, the packets relating to the same channel are organized to be of the same length depending in particular on the data-rate requested by the application using the channel in question. By way of non-limiting example, each of the packets for an application, of the television program broadcasting type, can be organized to comprise a header made up of five bytes, forty-four bytes of working information, assumed in this example to be equally shared between a plurality of programs, e.g. ten, and four bytes for checking that the packet as received complies with the packet as transmitted.

The centralizing communications equipment 4 includes means (not shown) enabling it to insert, in a manner known per se, synchronization information in the header of each of the packets that it transmits via the transmit and receive cable 3 to the communications terminal appliances 2. This synchronization information may, for example, be constituted by a particular byte, it can be used by the communications terminal appliances 2 for using the packets that they receive and for transmitting any packets that they produce.

In a preferred embodiment, the centralizing communications equipment 4 initializes packet transmission periodically or almost periodically in each of the channels used in the installation that includes it, as a function of the specific needs of the applications to which the channels are allocated. This initialization can be limited to transmission of a packet header portion in a determined channel, when the centralizing communications equipment 4 has no working information to be conveyed in said channel. The packet may then optionally be completed by a communications terminal appliance 2 that wishes to transmit at that time in said channel.

In contrast, filling a packet after initialization is completed by the centralizing communications equipment 4, when said equipment has information to be conveyed via the transmit and receive cable 3 to at least one of the communications terminal appliances 2 of the installation. It then transmits the packet without interruption and in its entirety, i.e. the sequence composed by the full header, followed by the working information to be transferred, and by the information necessary for checking the compliance of the packet on reception.

In one preferred embodiment, the packet header portion transmitted by the centralizing communications equipment 4 in a determined channel includes an indication of the availability of the packet, which indication is intended for the communications terminal appliances 2 that can transmit in the channel, in the event that there is no prior reservation of the packet.

Any communications terminal appliance 2 having the capacity to transmit over said channel can attempt to reserve the transmitted packet and/or at least one available subsequent packet depending on its transmission needs. For this purpose, such a communications terminal appliance 2 transmits to the transmit and receive cable 3 in the chosen channel after the header portion that it has received from the centralizing communications equipment 4.

Depending on needs, transferring information from a communications terminal appliance 2 to the centralizing communications equipment 4 might need a single packet, successive packets with no time constraint, or successive packets distributed almost periodically.

In the latter two cases, in a preferred embodiment, packets can be reserved by the centralizing communications equipment 4 as a function of the needs of a communications terminal appliance 2, and for the benefit thereof by indicating the address of the terminal appliance in the header of the packets which are specifically reserved for it for transmission.

Whenever two communications terminal appliances 2 can simultaneously seek to reserve a packet indicated as being available in the same channel, provision is made to implement a collision processing method whereby each of the terminal appliances is warned that its attempt to reserve the packet by transmitting to the transmit and receive cable 3 has not succeeded properly at the centralizing communications equipment 4.

Such methods are well known to persons skilled in the art and they lead, for example, to attempts being repeated by competing terminal appliances with, in practice, an offset between attempts by the terminal appliances enabling one of them to succeed before the other, after each of the terminal appliances has separately learnt or determined that its previous attempt has failed.

As indicated above, FIG. 3 makes it possible to define succinctly the essential elements making up a terminal appliance 2 which, in the non-limiting example chosen, corresponds to a terminal appliance 2D as defined in FIG. 1. For example, the terminal appliance 2D may correspond to a camera or a camcorder for performing remote surveillance of a process. It is thus assumed to be provided with both-way communications means enabling it to be remotely controlled from another terminal appliance situated inside or outside the installation, and to transmit the image and optionally sound information obtained by means of the camera.

The apparatus 2D includes a set of means 17 which are specific to the functions to be performed, i.e. in this example the functions of picking up images and optionally sound, the set of means 17 being conventionally designed to receive control information in the form of determined signals and to supply image and sound signals in a determined form. The forms of the signals locally received or produced do not necessarily correspond to the form in which the information can be transmitted by a terminal appliance 2 in the communications system of the invention. Provision is therefore made to add an adapter facility 47 for this purpose if need be.

As already suggested, such an adapter facility 47 can be disposed in different ways in the set that forms the terminal appliance 2D that includes it. In this example, it is assumed to be included in the adapter means 22 of the terminal appliance, which means in particular put into packets the information supplied by the set of means 17, i.e. the image and optionally sound information and any signalling information associated therewith, the information being assumed in this example to be put into packets by means of a signal processing facility 48. This facility is connected to a transmitter facility 49 so as to enable the packets it produces to be transmitted over a radio link via a radio interface 50 and an antenna 13 to the transmit and receive cable 3 of the installation in question.

The transmitter facility is frequency driven by a clock facility 51 placed under the control of a management processor 52 assigned to the terminal appliance 2D. As already indicated above, the positioning of the above-mentioned component elements in the set defined herein as a terminal appliance can be varied as a function of the physical constraints, and therefore it should not be considered as being limiting.

As already indicated above, the terminal appliance 2D receives and retains, e.g. in a memory associated with the management processor 52 that it includes, indications defining the sub-bands relating to the channels that it can use. In this example, these indications are assumed to be conveyed via the above-mentioned common service channel. They are therefore assumed to be received from the centralizing communications equipment 4 via the antenna 13, via the radio interface 50, and via a receiver facility 53. A signal processing facility 54 optionally merged with the facility 48 makes it possible to convert the packets received from the receiver facility into a form usable depending on the destinations by the management processor 52, by the adapter facility 47 or optionally directly by the set of functional means 17 itself.

The terminal appliances 2 of an installation, such as in particular the terminal appliance 2D, which can transmit to the centralizing communications equipment 4 of the installation, in a determined channel and via the transmit and receive cable 3, receive the synchronization signals transmitted by said equipment via said channel, and can transmit themselves in this channel by means of packets whose respective headers indicate that they are available. Each of the terminal appliances can optionally reserve packets for its transmissions by sending suitable request information. If need be, it can also transmit control or more generally signalling information in similar manner.

The terminal appliances 2 of an installation that can receive information transmitted by the centralizing communications equipment 4 via the transmit and receive cable 3 can be set to the channel to be received by construction or by pre-selection for the less sophisticated terminal appliances, and by using indications conveyed by the common service channel for the other terminal appliances.

We claim:

1. A communications system for a subscriber installation, the system including centralizing communications equipment (4) provided with first transmitter-receiver means (5, 6) connected to at least one transmit and receive cable (3) for transmitting and receiving radio signals, which cable extends throughout the installation and enables the centralizing equipment to have terminal appliances (2) communicate via radio signals, each of which terminal appliances is provided with second transmitter and/or receiver means (8 to 12) for this purpose, the centralizing equipment (4) and the terminal appliances (2) being respectively provided with first means and with second means enabling them to transmit and/or to receive digitized information put in the form of packets in "N" predetermined distinct channels of the frequency band usable with a cable (3), said centralizing equipment being characterized in that it also includes detection means (38) for determining the frequencies of all of the transmissions received via the cable(s) in the installation, and selection means (45) for determining, as a function of the indications supplied by the detection means, the transmit and receive channels allocated to the centralizing communications equipment and to the terminal appliances.

2. A system according to claim 1, characterized in that it includes a common service channel used by the centralizing communications equipment (4) and by the terminal appliances (2) of the installation for transmitting, in the form of packets, indications relative to frequency setting of the second transmitter and/or receiver means included in said terminal appliances.

3. A system according to claim 1, characterized in that it includes at least one "interconnection" channel used by the transmitter means (10, 11, or 12) of a terminal appliance (2) of the installation for transmitting information to the first receiver means (6) of the centralizing equipment and addressed to another terminal appliance (2) of the installation.

4. Centralizing communications equipment for a communications system of a subscriber installation, the equipment being provided with first transmitter-receiver means (5, 6) connected to at least one transmit and receive cable (3) for transmitting and receiving radio signals, which cable extends throughout the installation and enables the centralizing equipment to have terminal appliances (2) communicate via radio signals, each of which terminal appliances is provided with second transmitter and/or receiver means (8 to 12) for this purpose, said centralizing communications equipment being characterized in that it includes:

first means enabling it to transmit and/or to receive digitized information put in the form of packets in "N" predetermined distinct channels of the frequency band usable with a cable (3);

detection means (38) for determining the frequencies of all of the transmissions received via the cable(s) in the installation; and selection means (45) for determining, as a function of the indications supplied by the detection means, the transmit and receive channels allocated both to the centralizing communications equipment and also to the terminal appliances in the installation.

5. Equipment, of the subscriber terminal appliance type, for a communications system for a subscriber installation, the system including centralizing communications equipment (4) provided with first transmitter-receiver means (5, 6) connected to at least one transmit and receive cable (3) for transmitting and receiving radio signals, which cable extends throughout the installation and enables the centralizing equipment to have items of equipment of the terminal appliance type communicate via radio signals, each of which items of equipment is provided with second transmitter and/or receiver means enabling it to transmit and/or receive digitized information put in the form of packets in at least one of the "N" predetermined distinct channels of the frequency band usable with a cable (3), said equipment being characterized in that each of said terminal appliances includes second transmitter and/or receiver means (8 to 12) enabling it to use at least one common service channel organized to convey frequency setting indications in the form of one or more packets.

* * * * *